United States Patent
McAmish et al.

(10) Patent No.: US 6,191,221 B1
(45) Date of Patent: Feb. 20, 2001

(54) BREATHABLE FILM COMPOSITIONS AND ARTICLES AND METHOD

(75) Inventors: Larry McAmish, Cornelius, NC (US); Timothy Huskey, Suwanee, GA (US)

(73) Assignee: Polymer Group, Inc., North Charleston, SC (US)

( * ) Notice: Under 35 U.S.C. 154(b), the term of this patent shall be extended for 0 days.

(21) Appl. No.: 09/163,128

(22) Filed: Sep. 29, 1998

(51) Int. Cl.$^7$ ............ C08L 31/02; C08L 33/06; C08L 62/02; C08L 75/04
(52) U.S. Cl. ............ 525/131; 525/173; 525/176
(58) Field of Search ............ 525/131, 173, 525/176

(56) References Cited

U.S. PATENT DOCUMENTS

| | | | | |
|---|---|---|---|---|
| 3,879,493 | * | 4/1975 | Mudde | 525/127 |
| 5,532,053 | * | 7/1996 | Mueller | 428/287 |
| 5,840,812 | * | 11/1998 | Schultze | 525/458 |
| 5,959,042 | * | 9/1999 | Bouilloux | 525/420 |
| 6,001,464 | * | 12/1999 | Schultze | 428/220 |

\* cited by examiner

*Primary Examiner*—Patricia A. Short
(74) *Attorney, Agent, or Firm*—Pyle & Piontek

(57) ABSTRACT

A breathable film is composed of a uniform blend of two thermoplastic resins, one having a high moisture vapor transmission rate and the other having a low rate. The blend is melt extruded into a film having good handling characteristics and a controlled degree of moisture vapor transmission, as determined by blend ratio per unit of film thickness.

4 Claims, No Drawings

BREATHABLE FILM COMPOSITIONS AND ARTICLES AND METHOD

BACKGROUND OF THE INVENTION

This invention relates to breathable films, or films capable of transmitting water vapor but generally resistant to the passage of water in a liquid form.

Breathable films have been known and used for many years in the production of, for example, water proof clothing, to allow escape of water vapor from the surface of the skin of the wearer outwardly. Vapor breathable films can be broadly classified as being a microporous film or a monolithic film.

A microporous film has a large number of pores formed in the film using special processing conditions. One method of obtaining microporosity is described in U.S. Pat. No. 3,870,593. A quantity of powdered inert material such as calcium carbonate is incorporated into the film prior to extrusion. After extrusion, the film is drawn, causing small pores to be established at the sites of the filler particles. As described in U.S. Pat. No. 4,308,303 after production of the microporous film, the film may be coated with fibers to produce a composite. The lamination of microporous films to fabrics is also well known.

Microporous films are not suitable for certain end uses and are not desirable for others due to their nature of indiscriminately passing all gases, vapors and other agents such as pathogens. These films, for example, are generally not suitable as viral barriers, and garments and other articles having a viral barrier yet good breathability are highly desirable in the medical and other industries where exposure to blood is commonplace.

A second class of breathable films can be referred to as monolithic films, in which the film is continuous and free of pores. Monolithic breathable films are capable of allowing the transfer of certain gases and liquid vapors due to chemical absorption, transfer through the film thickness and release on the opposite surface. For films having a high rate of moisture transmission, the rate of transfer is very rapid, and is driven by the relatively high concentration and pressure of vapor on one side of the film. This mechanism of transfer is described in U.S. Pat. No. 5,445,874, which discloses thin films of certain polyurethanes which possess moisture vapor transmission rates (MVTR) higher than the human skin, allowing the film to be used as an outer layer in burn dressings.

Several thermoplastic resins are currently available which allow the extrusion of films having a high MVTR. Examples include polyurethanes, copolyesters and polyester elastomers. These resins can be extrusion coated on a porous support substrate such as a woven or nonwoven fabric which is used to make protective clothing and other articles.

Apart from being relatively expensive in comparison to other film forming thermoplastic polymers, the above noted polymers are not suitable for certain types of end uses. The only way to change the MVTR of the film is to increase or decrease the thickness of the film, with thinner films providing higher MVTR's. Some films cannot be laminated directly to certain fabrics, for example, by extrusion coating, or the bond between the fabric and the film is unduly weakened by use. Also, these breathable films tend to be harsh and noisy when combined with fabrics and may not have an attractive visual appearance. Since all these properties are important from the viewpoint of manufacture and successful end use, additional improvements in the field of breathable monolithic films are needed.

SUMMARY OF THE INVENTION

In accordance with the present invention, a vapor breathable monolithic film is provided, which film can be continuously extruded as a hot melt. The hot melt can be extruded into a film or extruded directly onto a substrate, such as a porous fabric, with excellent adhesion.

The film is composed of a homogeneous and uniform blend of at least two thermoplastic polymers. One of the polymers, if used alone and formed into a thin film, exhibits a high moisture vapor transmission rate. The second polymer, if used alone and formed or extruded into a thin film, exhibits a low MVTR. When blended together at varying ratios, the blend can be hot melt extruded into a film having desirable properties and characteristics beyond either of the individual components. The film has a softer feel and better adhesion to fabrics in comparison to high MVTR films alone. Notwithstanding the inclusion of substantial amounts of low MVTR components, the composite film will still have a high MVTR, suitable for use on breathable articles.

Whereas the degree of breathability of prior art films was dictated primarily by film thickness, the MVTR rating of the monolithic film of the present invention can be fixed per unit of thickness by adjusting the ratio of the two components in the blend. This feature offers benefits to a variety of end use applications, where, for example, a specific film thickness is designated.

One of the components is selected from the group consisting of polyester resins, copolyester elastomers and polyurethanes, which are capable of being extruded into a film having a high MVTR. The second component is selected from a group of ethylene esther copolymers, such as ethylene vinyl acetate and ethylene methyl acrylate. Those polymers, when used alone, provide a film having a very low MVTR. The weight of the second component in the blend, based on total weight, is from 10% to 80%.

DETAILED DESCRIPTION

As used herein, the term moisture vapor transmission rate or MVTR is a value expressed in terms of grams of transmitted moisture per square meter of film over a 24 hour or one day period as determined by standard test procedures known to those skilled in the art. The standard procedures employed herein is known as ASTM E96, 1980 revision, Procedure D, method X1.15, a water method at 90° F.

The term "blend" as used herein refers to a compatible homogeneous mixture of two thermoplastic polymers, which can be melted together and cooled to form a monolithic structure, such as a thin, continuous film. Many thermoplastic polymers cannot be successfully blended together and tend to separate when heated and passed through an extruder.

The term "low MVTR polymer or film" means a thermoplastic polymer, when extruded into a film having a thickness of one mil or about 25 microns, will have a MVTR of less than 350 g/m$^2$/day. The term "high MVTR polymer or film" means a thermoplastic polymer, when extruded or cast in a film having a thickness of one mil or about 25 microns, will have a MVTR of greater than 500g/m$^2$/day.

The present invention contemplates the use of blends of high and low MVTR thermoplastic resins, which can be melted together and extruded or cast into thin films either as a film alone, or as a layer on a fabric. If high MVTR resins are used alone to form films, in many cases the film will have an excessive MVTR, and the only solution is to increase the thickness of the film, and hence the cost. By using the blends of resins disclosed herein, the ratio of the polymers may be adjusted to obtain a desired MVTR rating at a specified thickness.

In the preferred embodiment, the low MVTR resin is incorporated into the blend in the amount of 10% to 90% by weight, with the remainder as the high MVTR resin. It has been found that if the level of high MVTR resin falls significantly below 10%, the MVTR of the blend becomes too low. Also, as a general rule, the MVTR of the film increases as the thickness decreases. The thickness is dictated by practical and cost considerations. Within the blend parameters set forth above, some of the practical considerations include durability of the film when used alone or as a layer with a fabric, and the minimum thickness at which a film can be formed using conventional equipment. The minimum thickness is in the order of five to ten microns, and the maximum thickness can extend up to 75 microns. A thin film having a higher amount of low MVTR resin might be used, for example, as an outer barrier for single use garments such as diapers. Thicker films might be employed in articles where durability is a more important factor. A preferred thickness range is in the order of 10 to 40 microns.

In cases where the thickness of the film and MVTR are dictated by end use, the ratio of the low and high MVTR resins can be adjusted to obtain the desired MVTR in the film, as demonstrated in the following examples.

Specific examples for high MVTR resins include polyurethanes, copolyesters, and polyester elastomers having a MVTR rating in excess of 500 for a 25 micron film. Specific examples of low MVTR resins include ethylene copolymers, especially those which include units of ethyl methyl acrylate and ethyl vinyl acetate. The two classes of polymers have been found to provide a uniform blend which can be melted and passed through a heated extruder and through a slot die to produce a monolithic film free of voids or layers.

For many end uses, the film will be laminated to a porous fabric. While the film may be produced separately and laminated to a fabric using an adhesive, extrusion coating of a molten layer directly onto a fabric is most preferred. This is easily accomplished by passing the fabric between the nip of two rotating rolls, and extruding the film onto the fabric at or near the nip.

In comparison to films made solely from high MVTR resins alone, it has been found that the blends of the present invention adhere better to a variety of fabric substrates, including those based on natural and synthetic fibers or yarns. The fabric may be of the woven type or a nonwoven. Nonwovens include spunbond fabrics of continuous filaments, and webs of nonwoven fibers bonded together by heat fusion, adhesives, or mechanically bonded by hydroen tanglement or needling. A variety of nonwoven fabrics are available, and these are typically composed of fibers or filaments of polymers such as polyester, nylon and polyolefins, including polyethylene and polypropylene. Since the film resides as a layer on one side of the fabric, the basis weight of the fabric is not critical, and depends on the end use of the product. Composite fabrics may be employed, such as spunbond-meltblown-spunbond fabrics, or the film may save as a backing for looped fabrics.

Additional details are provided in the following examples.

EXAMPLE I

The resin system used in this example was a blend of a polyesterelastomer (Arnitel PL380 from Dutch State Mines) and ethylene vinyl acetate copolymer (Ateva 1815 from AT Plastics). A 25 micron film of the polyesterelastomer has a MVTR in excess of 2000 $g/m^2/24$ hr. A 25 micron film of the ethylene vinyl acetate copolymer has a MVTR of less than 100.

The PL380 was fed from sealed bags to a mixer to prevent pickup of moisture. The 1815 was added from open boxes to the mixer. A continuous gravimetric blender was used to combine 60% by weight PL380 and 40% by weight 1815 in a chamber directly above an extruder. The extruder was a standard single screw extruder followed by a screen pack metering pump and coat hanger slot die. The extrusion temperature ranged from 375° F. in the second zone of the extruder to 450° in the die. The blend was cast into a film, which is still in a molten stage upon exit from the die. The molten blanket of blended polymer was drawn between the nip of two rolls. One of the rolls was a smooth roll heated to 185° F. and the other was a rubber coated roll maintained at a temperature of about 50° F. Upon exit from the nip, the film was in a solid state and was passed onto a chill roll maintained at about 40° F. to complete the quenching process. A 25 micron film was cast in this manner and was found to have a MVTR of 1200 $g/m^2/day$.

EXAMPLE II

This example illustrates the on-line lamination of a blended film to the nonwoven fabric. The fabric was a carded, adhesive bonded nonwoven fabric of polyester fibers available from The Polymer Group (PGI Nonwovens) as Duratex 6864.

The fabric was unwound from a roll located above the cast station and fed onto the heated smooth roll and through the nip. The same process conditions of Example I were employed, except that the heated roll was heated to 210° F. The die can be adjusted to contact the fabric prior to the nip, at the nip, or the chill roll, with decreasing film adhesion of the three locations. In this example, the molten film was fed into the nip. The roll speed controls the thickness of the film, assuming a constant rate of extrusion from the die. In this example, the line speed was increased to provide a solid film coating of approximately 18 microns (0.7 mil) thick. The MVTR was found to be 1350 $g/m^2/day$.

EXAMPLE III

Using approximately the same processing conditions as Example II, the fabric was coated with 100% PL380 and 100% Ateva 1815 in two separate runs. The PL380 sample had a high MVTR but delaminated when handled. Also the coating had poor aesthetics and was stiff. The Ateva 1815 sample was found to have excellent adhesion to the fabric but had a MVTR rating of less than 100 $g/m^2/day$.

EXAMPLE IV

This example illustrates the ability to control the degree of breathability or MVTR of a film of given thickness using different blend ratios. Polymer characteristics are shown in Table I below.

TABLE I

Polymers Used in Prototype Preparation

| Polymer | Supplier | Type | MFI, g/ 10 min | Density | Detail |
|---|---|---|---|---|---|
| ARNITEL PL380 | DSM | copolyester | 25 | 1.16 | |
| EM806009 | Equistar | ethylene methyl acrylate | 6 | 0.94 | 20% MA |
| AVETA 1815 | AT Plastics | ethylene vinyl acetate | 2.5 | 0.94 | 18% VA |

Monolithic films were prepared using neat systems of each of the three polymers and then blends of Arnitel with either the EMA or EVA polymers. Blend ratios tested were 20–60% of the non-breathable constituent, balanced with the breathable copolyester. The final variable was film basis weight, held at 15 gsm or 30 gsm. Table II below provides the corresponding film gauge in microns (micrometers) for the various systems. The films were all tested in triplicate for MVTR according to ASTM E96, 1980 revision, Procedure D, method X1.15, a water method at 90° F.

TABLE II

Vapor Permeability if Films

| | basis weight, gsm | thickness, m | MVTR, g/m²/day |
|---|---|---|---|
| 100% copolyester | 15 | 13 | 3441 |
| | 30 | 26 | 2232 |
| 100% EMA | 15 | 14.5 | 305 |
| | 30 | 29 | 139 |
| 100% EVA | 15 | 14.5 | 25 |
| | 30 | 29 | 0 |
| EMA/copolyester | | | |
| 20/80 | 15 | 13.5 | 3362 |
| | 30 | 27 | 2115 |
| 40/60 | 15 | 14 | 2139 |
| | 30 | 28 | 1719 |
| EVA/copolyester | | | |
| 20/80 | 15 | 13.5 | 3486 |
| | 30 | 27 | 1440 |
| 40/60 | 15 | 14 | 2280 |
| | 30 | 28 | 1419 |

What is claimed is:

1. A breathable film, said film consisting essentially of a blend of high MVTR thermoplastic polymer selected from the group consisting of polyurethanes, polyesters and copolyesters, and a low MVTR thermoplastic ethylene ester copolymer, said film being a monolithic single layer film and having a breathability in proportion to the ratio of the high and low MVTR polymers.

2. The breathable film of claim 1 wherein said film comprises from 10 to 60 percent of the high MVTR thermoplastic polymer.

3. The breathable film of claim 1 wherein said film comprises from 40 to 90 percent of the low MVTR thermoplastic polymer.

4. The breathable film of claim 1 wherein said ethylene ester copolymer is selected from the group consisting of ethylene methyl acrylate and ethylene vinyl acetate copolymers.

* * * * *